(12) United States Patent
Ko et al.

(10) Patent No.: US 7,768,340 B2
(45) Date of Patent: Aug. 3, 2010

(54) VOLTAGE PUMPING DEVICE

(75) Inventors: Han Suk Ko, Seongnam-si (KR); Ki Teok Park, Icheon-si (KR)

(73) Assignee: Hynix Semiconductor Inc., Icheon-si (KR)

( * ) Notice: Subject to any disclaimer, the term of this patent is extended or adjusted under 35 U.S.C. 154(b) by 145 days.

(21) Appl. No.: 11/824,927

(22) Filed: Jun. 29, 2007

(65) Prior Publication Data

US 2008/0116958 A1    May 22, 2008

(30) Foreign Application Priority Data

Nov. 21, 2006    (KR) ................ 10-2006-0115283

(51) Int. Cl.
*G05F 1/46* (2006.01)
*G11C 5/14* (2006.01)

(52) U.S. Cl. .................. 327/536; 327/143; 363/60; 365/189.09

(58) Field of Classification Search ............. None
See application file for complete search history.

(56) References Cited

U.S. PATENT DOCUMENTS

| | | | |
|---|---|---|---|
| 5,530,397 A * | 6/1996 | Nakai et al. ............ | 327/545 |
| 6,175,263 B1 * | 1/2001 | Lee et al. .............. | 327/536 |
| 6,205,079 B1 * | 3/2001 | Namekawa ............. | 365/226 |
| 6,765,428 B2 * | 7/2004 | Kim et al. .............. | 327/534 |
| 6,867,641 B2 * | 3/2005 | Kang et al. ............. | 327/541 |
| 7,227,764 B2 | 6/2007 | Chueh et al. | |

FOREIGN PATENT DOCUMENTS

| | | |
|---|---|---|
| JP | 07-296583 | 11/1995 |
| KR | 10-2002-0034218 A | 5/2002 |
| KR | 10-2003-0002508 A | 1/2003 |
| KR | 10-2006-0053429 A | 5/2006 |
| KR | 10-2007-0109111 | 11/2007 |

\* cited by examiner

*Primary Examiner*—Lincoln Donovan
*Assistant Examiner*—Terry L Englund
(74) *Attorney, Agent, or Firm*—John P. White; Cooper & Dunham LLP

(57) ABSTRACT

A voltage pumping device is provided which includes a source voltage generator for generating a source voltage which has a first voltage level for a predetermined period and a second voltage level after a lapse of the predetermined period, the second voltage level being constant, and a pumping circuit configured to receive the source voltage and pump a predetermined voltage.

8 Claims, 5 Drawing Sheets

VOLTAGE PUMPING DEVICE

BACKGROUND

The present disclosure relates to a voltage pumping device, and more particularly to a voltage pumping device which is capable of removing instability resulting from over-pumping.

In general, a dynamic random access memory (DRAM) includes a plurality of memory cells into/from which data can be written or read and each of which is composed of one transistor and one capacitor. Because an n-channel metal oxide semiconductor (NMOS) transistor is employed as the transistor constituting the memory cell of the DRAM, a voltage pumping device for word line driving is provided in the DRAM to generate a potential of 'external voltage VDD+ threshold voltage Vt or more' in consideration of a voltage loss resulting from the threshold voltage Vt of the NMOS transistor.

In other words, in order to turn on the NMOS transistor, which is mainly used in the DRAM memory cell, a voltage which is higher than the source voltage of the NMOS transistor by the threshold voltage Vt or more must be applied to the gate of the NMOS transistor. Because the maximum voltage applied to the DRAM generally has a VDD level, it is necessary to apply a boosted voltage of VDD+Vt or more to the gate of the NMOS transistor in order to read or write a voltage of a complete VDD level from or into the cell or bit line.

On the other hand, various efforts have recently been made to reduce current consumption in semiconductor devices. In particular, various researches are in progress for reducing current consumption in a self-refresh mode of a DRAM semiconductor device. Current consumed to store data in each memory cell in the self-refresh mode, measured for a self-refresh time, is called self-refresh current. In order to reduce this self-refresh current, it is necessary to increase a self-refresh period. In turn, in order to increase the self-refresh period, it is necessary to increase a data retention time, that is, a time for which data is retained in each memory cell. One approach to increasing the data retention time is to increase a back bias voltage VBB to be applied to the transistor of each memory cell. In this method, the data retention time is increased in the self-refresh mode by relatively raising a back bias voltage VBB pumped and outputted from a voltage pumping device and supplying the raised voltage to reduce off leakage current of the cell transistor.

To sum up, the high voltage VPP is a voltage that mainly drives word lines of a DRAM device, and the back bias voltage VBB is a voltage that is applied to a transistor-formed area of each memory cell to reduce self-refresh current. These high voltage VPP and back bias voltage VBB are generated from a voltage pumping device comprising an oscillator and a voltage pump.

However, such a conventional voltage pumping device has a disadvantage in that it is driven in the same manner irrespective of the level of a supply voltage VDD which is applied as a drive voltage thereto, resulting in a deterioration in characteristics thereof. Particularly, when the level of the supply voltage VDD applied to the voltage pumping device becomes higher, a peak noise phenomenon may occur due to over-pumping, thus considerably degrading stability of the device.

BRIEF SUMMARY

In an aspect of the present disclosure, a voltage pumping device comprises a source voltage generator for generating a source voltage which has a first voltage level for a predetermined period and a second voltage level after a lapse of the predetermined period, the second voltage level being constant and a pumping circuit configured to receive the source voltage and pump a predetermined voltage.

Preferably, the source voltage generator comprises a switching device connected between a first voltage supply terminal and an output terminal, the switching device generating the source voltage in response to a voltage of a third voltage level and outputting the generated source voltage to the output terminal.

The first voltage level may be a supply voltage level, the second voltage level may be a core voltage or peri voltage level, and the third voltage level may be a high voltage level.

Alternatively, the source voltage generator may comprise a supply voltage detector configured to receive the source voltage of the first voltage level and generate a switching signal which is enabled in response to the source voltage of the first voltage level, a first switching device connected between a first voltage supply terminal and an output terminal, the first switching device generating the source voltage in response to the switching signal and outputting the generated source voltage to the output terminal, and a second switching device connected between a second voltage supply terminal and an output terminal, the second switching device generating the source voltage in response to the switching signal and outputting the generated source voltage to the output terminal.

The first voltage level may be a supply voltage level, and the second voltage level may be a core voltage or peri voltage level.

The switching signal may be enabled after the lapse of the predetermined period.

Alternatively, the source voltage generator may comprise a transfer device for transferring the source voltage of the first voltage level to an output terminal for the predetermined period, and a differential amplifier for, after the lapse of the predetermined period, comparing a voltage level of a signal at the output terminal with a level of a reference voltage and amplifying a difference therebetween to output the source voltage of the second voltage level to the output terminal.

The differential amplifier may comprise a first pull-up device connected between a first voltage supply terminal and a first node, the first pull-up device pulling the first node up in response to a signal at the first node, a second pull-up device connected between the first voltage supply terminal and a second node, the second pull-up device pulling the second node up in response to the signal at the first node, an enabling device connected between a ground voltage terminal and a third node, the enabling device pulling the third node down in response to an enable signal, a first pull-down device connected between the second node and the third node, the first pull-down device pulling the second node down in response to the reference voltage, and a second pull-down device connected between the first node and the third node, the second pull-down device pulling the first node down in response to the signal at the output terminal.

The transfer device may be a PMOS transistor connected between the first voltage supply terminal and the output terminal, the PMOS transistor transferring the source voltage of the first voltage level to the output terminal in response to a signal at the second node.

Preferably, the pumping circuit comprises a voltage detector configured to receive a voltage of a third voltage level fed back thereto and a reference voltage and generate a voltage pumping enable signal, an oscillator for generating a clock signal in response to the voltage pumping enable signal, a pump controller for outputting a plurality of pump driving control signals in response to the clock signal, and a voltage pump for pumping the voltage of the third voltage level in response to the pump driving control signals.

The first voltage level may be a supply voltage level, the second voltage level may be a core voltage or peri voltage level, and the third voltage level may be a high voltage level.

Alternatively, the first voltage level may be a supply voltage level, the second voltage level may be a core voltage or peri voltage level, and the third voltage level may be a back bias voltage level.

The pump controller may be driven with the source voltage.

The voltage pump may be driven with the source voltage.

Alternatively, the pump controller and the voltage pump may be driven with the source voltage.

BRIEF DESCRIPTION OF THE DRAWINGS

The above and other aspects, features and other advantages of the subject matter of the present disclosure will be more clearly understood from the following detailed description taken in conjunction with the accompanying drawings, in which.

DETAILED DESCRIPTION

Preferred embodiments of the present invention will now be described in detail with reference to the accompanying drawings. A detailed description of known functions and configurations will be omitted when it may obscure the subject matter of the present invention.

A voltage pumping device according to the present invention is adapted to generate a source voltage which rises to the same level as that of a supply voltage VDD when the supply voltage VDD has a low level, and has a constant level when the supply voltage VDD is a high level, and supply the generated source voltage to a voltage pumping circuit, so as to prevent instability resulting from over-pumping.

Figure 1:
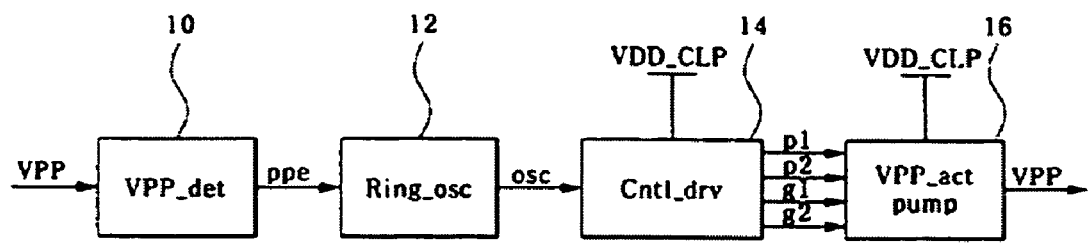
FIG. 1 is a block diagram showing the configuration of a voltage pumping device according to an exemplary embodiment of the present invention.

FIG. 1 is a block diagram showing the configuration of a voltage pumping device according to an exemplary embodiment of the present invention.

As shown in FIG. 1, the voltage pumping device according to this embodiment comprises a voltage detector VPP_det 10 configured to receive a high voltage VPP fed back thereto and generate a voltage pumping enable signal ppe, an oscillator Ring_osc 12 for generating a clock signal osc in response to the voltage pumping enable signal ppe, and a pump controller Cntl_drv 14 driven with a source voltage VDD_CLP for outputting pump driving control signals p1, p2, g1 and g2 in response to the clock signal osc. Preferably, the source voltage VDD_CLP has the same level as that of a supply voltage VDD when the supply voltage VDD has a low level, and the same level as that of a core voltage Vcore or peri voltage Vperi when the supply voltage VDD has a high level. Here, the level of the core voltage Vcore or peri voltage Vperi is constant. The voltage pumping device according to the present embodiment further comprises a voltage pump VPP_act pump 16 driven with the source voltage VDD_CLP for pumping the high voltage VPP in response to the pump driving control signals p1, p2, g1 and g2. Although the source voltage VDD_CLP has been disclosed in the present embodiment to be supplied to both the pump controller 14 and voltage pump 16, it may be supplied to only one of the pump controller 14 and the voltage pump 16.

The configuration of a source voltage generator which generates the source voltage VDD_CLP will hereinafter be described in detail.

Figure 2:
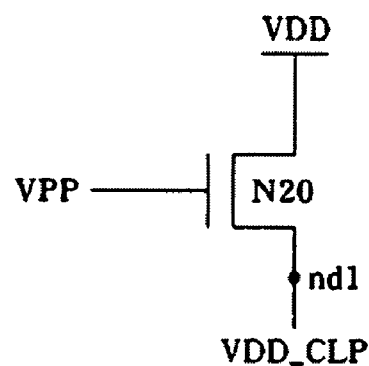
FIG. 2 is a circuit diagram of the source voltage generator for generating a source voltage shown in FIG. 1, in accordance with a first embodiment.

FIG. 2 is a circuit diagram of a first embodiment of the source voltage generator.

As shown in FIG. 2, the source voltage generator of this embodiment includes an NMOS transistor N20 connected between the supply voltage VDD and a node nd1 for generating the source voltage VDD_CLP in response to the high voltage VPP and outputting the generated source voltage VDD_CLP to the node nd1.

The source voltage generator with this configuration generates the source voltage VDD_CLP in a source following manner, which has the same level as that of the supply voltage VDD before the supply voltage VDD rises to a predetermined level, and a constant level after the supply voltage VDD rises to the predetermined level. A source voltage VDD_CLP generation operation of the present embodiment is performed as follows.

When the supply voltage VDD has a low level, the NMOS transistor N20 is turned on, so that charges flow to the node nd1. As a result, the source voltage VDD_CLP rises to the same level as that of the supply voltage VDD. On the other hand, at the time that the supply voltage VDD rises to the predetermined level or more, the NMOS transistor N20 is turned off, thus preventing charges from flowing to the node nd1. A level of the source voltage VDD_CLP does not rise because the source voltage VDD_CLP is disconnected from the supply voltage VDD.

Figure 3:
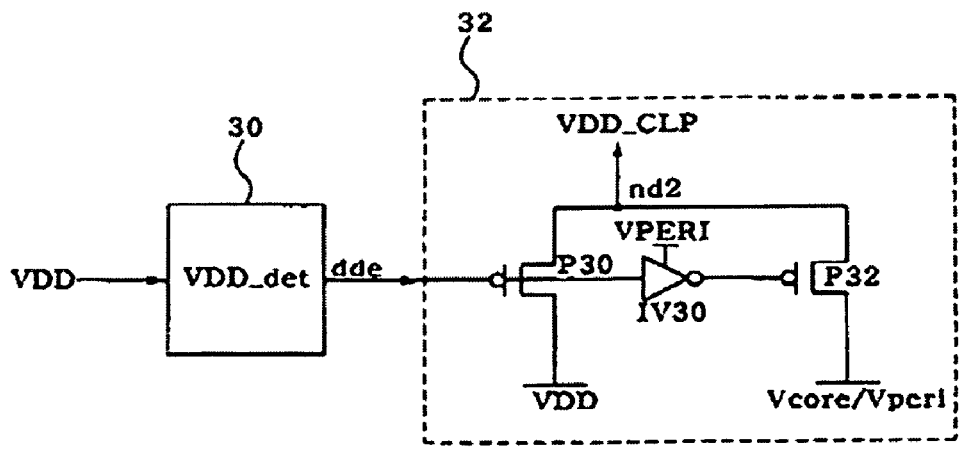
FIG. 3 is a circuit diagram of the source voltage generator for generating a source voltage shown in FIG. 1, according to a second embodiment.

FIG. 3 is a circuit diagram of a second embodiment of the source voltage generator.

As shown in FIG. 3, the source voltage generator according to this embodiment includes a supply voltage detector VDD_det 30 configured to receive the supply voltage VDD and generate a switching signal dde which is enabled in response to the supply voltage VDD, a p-channel metal oxide semiconductor (PMOS) transistor P30 connected between the supply voltage VDD and a node nd2 for generating the source voltage VDD_CLP in response to the switching signal dde and outputting the generated source voltage VDD_CLP to the node nd2, and a PMOS transistor P32 connected between the core voltage Vcore or peri voltage Vperi and the node nd2 for generating the source voltage VDD_CLP in response to an output signal from an inverter IV30 which is a buffered version of the switching signal dde and outputting the generated source voltage VDD_CLP to the node nd2.

The source voltage generator with this configuration generates the source voltage VDD_CLP which has the same level as that of the supply voltage VDD before the supply voltage VDD rises to a predetermined level, and a constant level, namely, the level of the core voltage Vcore or peri voltage Vperi after the supply voltage VDD rises to the predetermined level. Generation of the source voltage VDD_CLP of the present embodiment is discussed below.

When the supply voltage VDD has a low level, the switching signal dde becomes low in level, thereby causing the PMOS transistor P30 to be turned on and the PMOS transistor P32 to be turned off. As a result, the source voltage VDD_CLP from the node nd2 rises to the same level as that of the supply voltage VDD. On the other hand, after the supply voltage VDD rises to the predetermined level, the switching signal dde becomes high in level, so that the PMOS transistor P30 is turned off and the PMOS transistor P32 is turned on. Thus, the source voltage VDD_CLP from the node nd2 has the same level as that of the core voltage Vcore or peri voltage Vperi, namely, a constant level.

Figure 4:
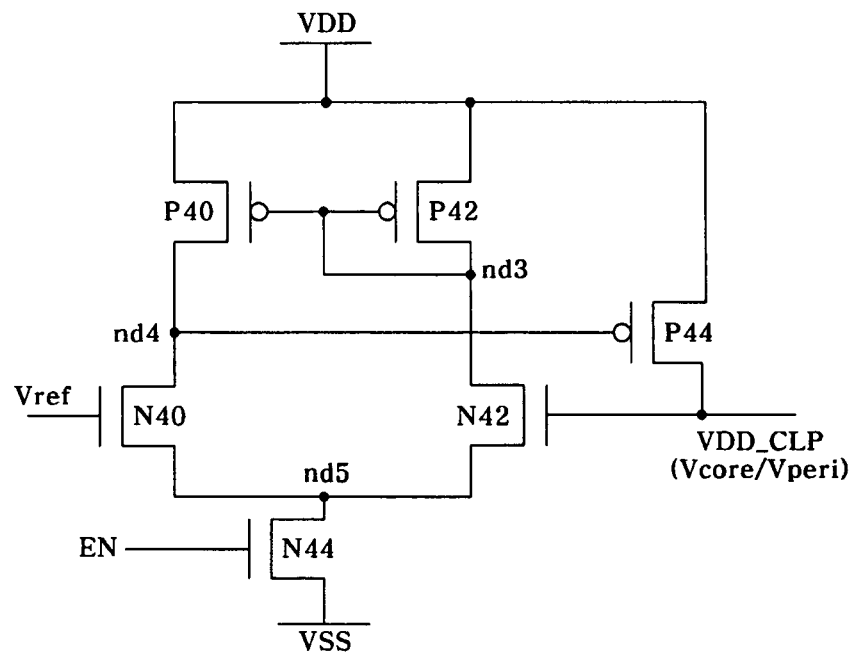
FIG. 4 is a circuit diagram of the source voltage generator for generating a source voltage shown in FIG. 1, according to a third embodiment.

FIG. 4 is a circuit diagram of a third embodiment of the source voltage generator.

As shown in FIG. 4, the source voltage generator according to this embodiment includes a differential amplifier for generating the core voltage Vcore or peri voltage Vperi, and a PMOS transistor P44 for selectively transferring the supply voltage VDD or the core voltage Vcore or peri voltage Vperi generated by the differential amplifier as the source voltage VDD_CLP.

The differential amplifier includes a PMOS transistor P40 connected between the supply voltage VDD and a node nd4 for pulling the node nd4 up in response to a signal at a node nd3, a PMOS transistor P42 connected between the supply voltage VDD and the node nd3 for pulling the node nd3 up in response to the signal at the node nd3, an NMOS transistor N44 connected between a ground voltage VSS and a node nd5 for pulling the node nd5 down in response to an enable signal EN which enables the differential amplifier, an NMOS transistor N40 connected between the node nd4 and the node nd5 for pulling the node nd4 down in response to a reference voltage Vref, and an NMOS transistor N42 connected between the node nd3 and the node nd5 for pulling the node nd3 down in response to a signal at a source voltage VDD_CLP output terminal.

The source voltage generator of this configuration generates the source voltage VDD_CLP which has the same level as that of the supply voltage VDD before the supply voltage VDD rises to a predetermined level, and a constant level, namely, the level of the core voltage Vcore or peri voltage Vperi after the supply voltage VDD rises to the predetermined level. A source voltage VDD_CLP generation operation of the present embodiment is performed as follows.

When the supply voltage VDD has a low level, the source voltage VDD_CLP becomes lower than the reference voltage Vref, so that the NMOS transistor N40 is turned on to a level higher than that of the NMOS transistor N42. As a result, the node nd4 becomes low in level, thereby causing the PMOS transistor P44 to be turned on to supply the supply voltage VDD as the source voltage VDD_CLP. Accordingly, the source voltage VDD_CLP rises to the same level as that of the supply voltage VDD. Meanwhile, after the supply voltage VDD rises to the predetermined level, the source voltage VDD_CLP becomes higher than the reference voltage Vref, so that the NMOS transistor N42 is turned on to a level higher than that of the NMOS transistor N40. As a result, the node nd4 becomes high in level, thereby causing the PMOS transistor P44 to be turned off, the source voltage VDD_CLP to be disconnected from the supply voltage VDD. A level of the source voltage VDD_CLP disconnected from the supply voltage VDD falls. If the source voltage VDD_CLP becomes lower than the reference voltage Vref, the NMOS transistor N40 is turned on.

Figure 5:
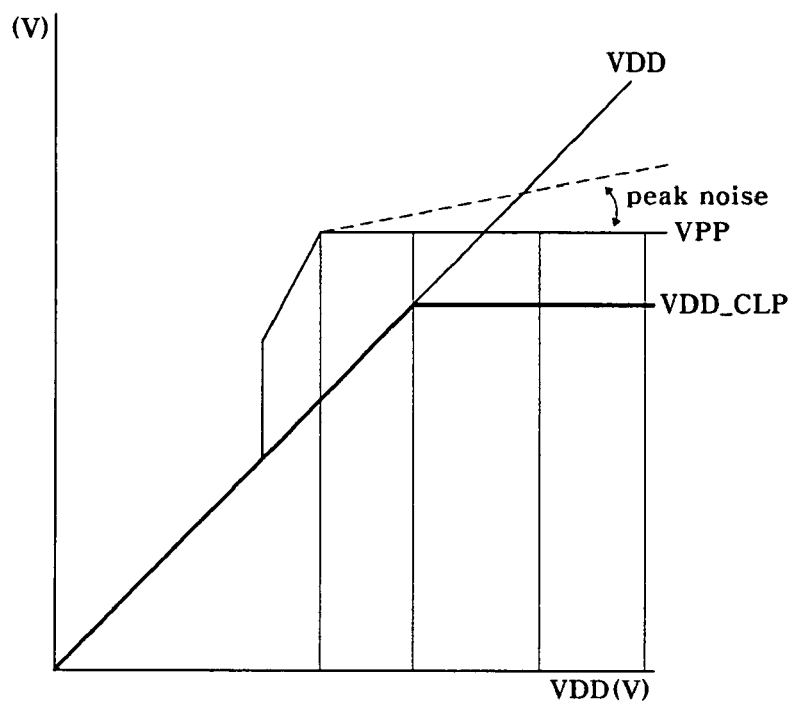
FIG. 5 is a waveform diagram of a source voltage generated from the source voltage generator shown in FIG. 1 and a high voltage pumped from a voltage pump shown in FIG. 1.

As described above, according to the above-stated embodiments, the source voltage generator generates the source voltage VDD_CLP which rises to the same level as that of the supply voltage VDD until the supply voltage VDD rises to the predetermined level, and has the same level as that of the core voltage Vcore or peri voltage Vperi, namely, a constant level after the supply voltage VDD rises to the predetermined level. The source voltage VDD_CLP generated in this manner is supplied to the pump controller 14 and/or voltage pump 16 of the voltage pumping device, so as to prevent the high voltage VPP from being over-pumped in the voltage pumping device. From FIG. 5, it can be seen that the source voltage VDD_CLP is maintained at a constant level after the supply voltage VDD rises to the predetermined level or more. It can also be seen from this drawing that the high voltage VPP, generated in the voltage pumping device supplied with the source voltage VDD_CLP, is pumped to a stable level with no peak noise occurring due to over-pumping even when the supply voltage VDD has a high level.

Figure 6:
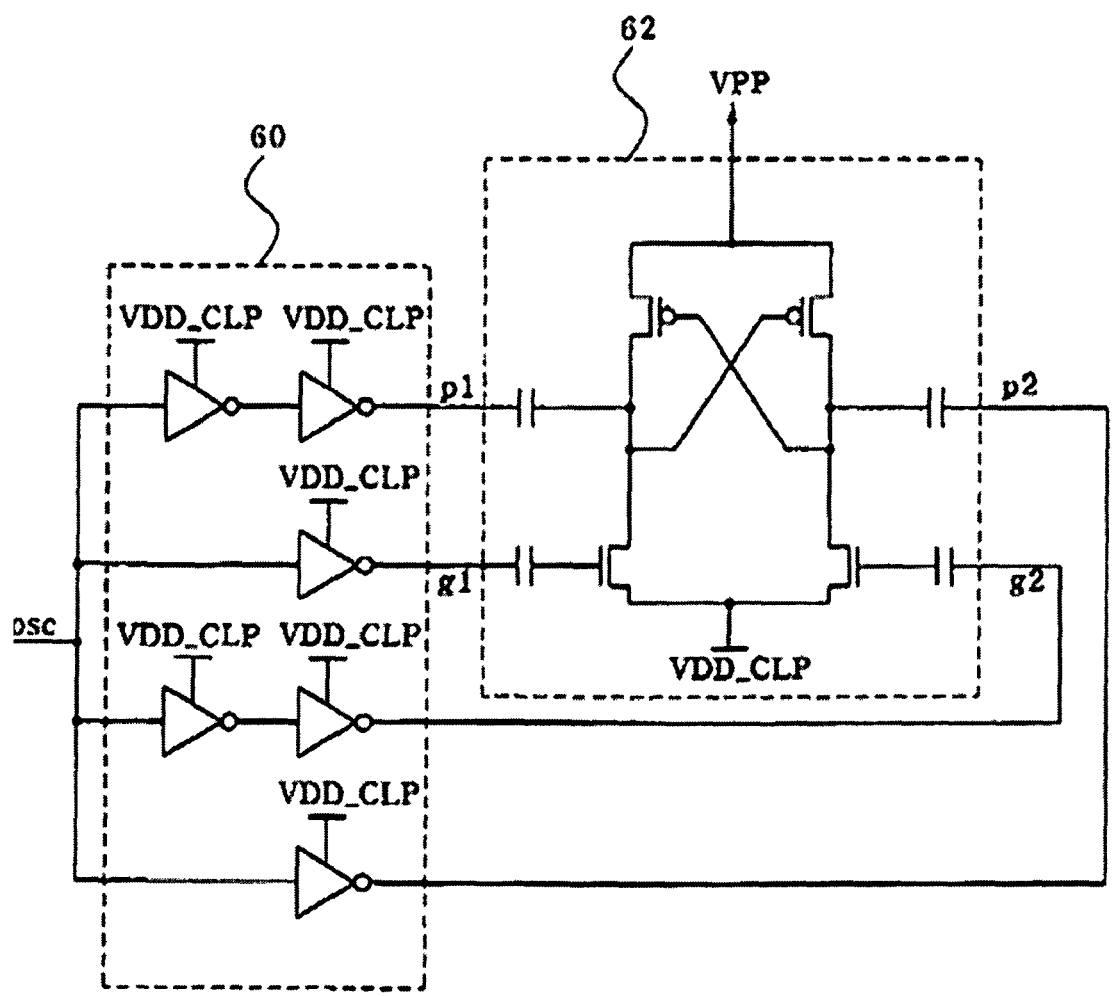
FIG. 6 is a circuit diagram of a pump controller and the voltage pump shown in FIG. 1.
Figure 7:
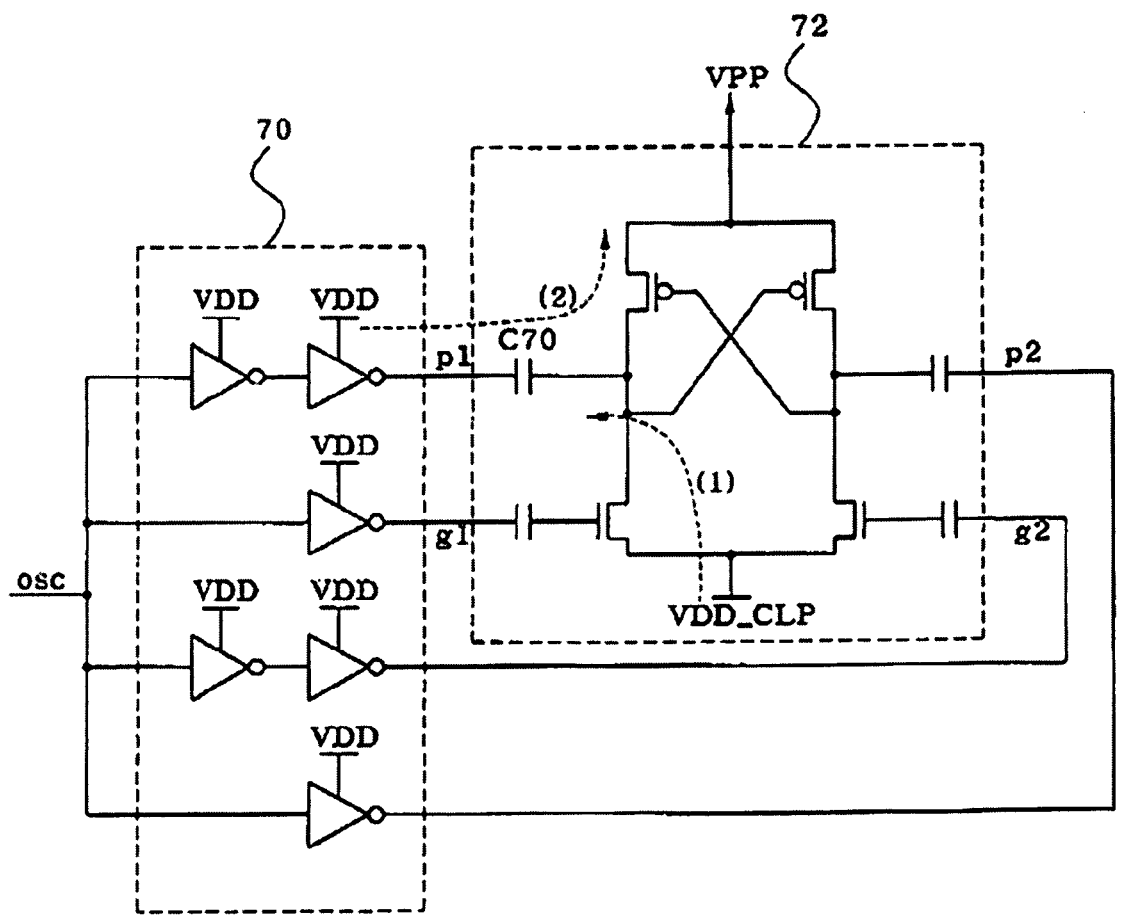
FIG. 7 is a circuit diagram of the pump controller and voltage pump shown in FIG. 1.

Preferably, the voltage pumping device is configured such that the source voltage VDD_CLP is supplied to both the pump controller (denoted by reference numeral 60 in FIG. 6) and voltage pump (denoted by reference numeral 62 in FIG. 6), as shown in FIG. 6. Alternatively, the voltage pumping device may be configured in such a manner that the source voltage VDD_CLP is supplied to only the voltage pump (denoted by reference numeral 72 in FIG. 7), as shown in FIG. 7. A high voltage pumping operation of the voltage pumping device with the configuration of FIG. 7 will hereinafter be described briefly.

Figure 8:
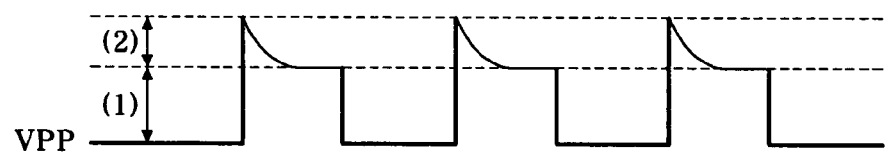
FIG. 8 is a waveform diagram of a high voltage pumped from the voltage pump shown in FIG. 7.

In the voltage pumping device configured as shown in FIG. 7, the source voltage VDD_CLP supplied to the voltage pump 72 charges a capacitor C70 (1) and the high voltage VPP is pumped under the control of the pump controller (denoted by reference numeral 70 in FIG. 7). At this time, a voltage of source voltage VDD_CLP+supply voltage VDD is supplied as the pumped high voltage VPP. FIG. 8 shows a waveform of the high voltage VPP pumped in the voltage pumping device of the present embodiment.

Figure 9:
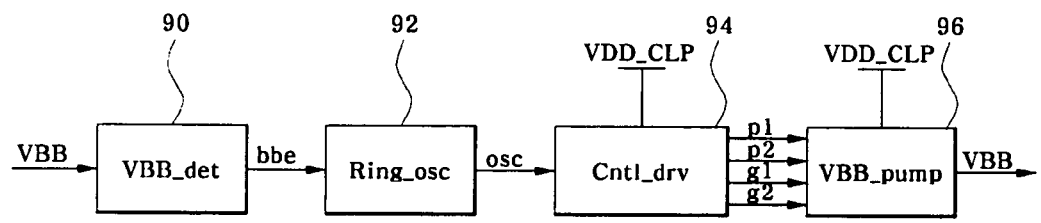
FIG. 9 is a block diagram showing the configuration of a voltage pumping device according to an alternative embodiment.

FIG. 9 is a block diagram showing the configuration of a voltage pumping device according to an alternative embodiment of the present invention.

As shown in FIG. 9, the voltage pumping device according to this embodiment comprises a voltage detector VBB_det 90 configured to receive a back bias voltage VBB fed back thereto and generate a voltage pumping enable signal bbe, an oscillator Ring_osc 92 for generating a clock signal osc in response to the voltage pumping enable signal bbe, and a pump controller Cntl_drv 94 driven with a source voltage VDD_CLP for outputting pump driving control signals p1, p2, g1 and g2 in response to the clock signal osc. Preferably, the source voltage VDD_CLP has the same level as that of a supply voltage VDD when the supply voltage VDD has a low level, and the same level as that of a core voltage Vcore or peri voltage Vperi when the supply voltage VDD has a high level. Here, the level of the core voltage Vcore or peri voltage Vperi is constant. The voltage pumping device according to the present embodiment further comprises a voltage pump VBB_pump 96 driven with the source voltage VDD_CLP for pumping the back bias voltage VBB in response to the pump driving control signals p1, p2, g1 and g2. Although the source voltage VDD_CLP has been disclosed in the present embodiment to be supplied to both the pump controller 94 and voltage pump 96, it may be supplied to only one of the pump controller 94 and the voltage pump 96. The operation of the voltage pumping device configured in this manner and the configuration and operation of a source voltage VDD_CLP generator according to the present embodiment are the same as those stated previously, and a detailed description thereof will thus be omitted.

Although the above embodiments have mainly been described exemplarily in connection with devices which pump the high voltage VPP, it will be understood that the principle of the present invention is usefully applicable to devices which pump the back bias voltage VBB, voltage generation devices of DRAMs or other memories using a charge pumping system, and all other devices in which overpumping becomes an issue.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The present application claims priority to Korean patent application number 10-2006-0115283, filed on Nov. 21, 2006, which is incorporated by reference in its entirety.

What is claimed is:

1. A voltage pumping device comprising:
   a supply voltage detector configured to receive a source voltage signal of a first voltage level and generate a switching signal which is enabled in response to the source voltage signal of the first voltage level;
   a first switching device connected between a first voltage supply terminal and an output terminal, the first switching device generating a source voltage in response to a first signal level of the switching signal and outputting the generated source voltage to the output terminal;
   a second switching device connected between a second voltage supply terminal and the output terminal, the second switching device generating the source voltage in response to a second signal level of the switching signal and outputting the generated source voltage to the output terminal; and
   a pumping circuit configured to receive an internal voltage and the source voltage, and pump the source voltage to provide the internal voltage,
   wherein the first and second switching devices are p-channel metal oxide semiconductor (PMOS) transistors.

2. The voltage pumping device according to claim 1, wherein the first voltage level is a supply voltage level.

3. A voltage pumping device comprising:
   a supply voltage detector configured to receive a source voltage signal of a first voltage level and generate a switching signal which is enabled in response to the source voltage signal of the first voltage level;
   a first switching device connected between a first voltage supply terminal and an output terminal, the first switching device generating a source voltage in response to a first signal level of the switching signal and outputting the generated source voltage to the output terminal;
   a second switching device connected between a second voltage supply terminal and the output terminal, the second switching device generating the source voltage in response to a second signal level of the switching signal and outputting the generated source voltage to the output terminal; and
   a pumping circuit configured to receive an internal voltage and the source voltage, and pump the source voltage to provide the internal voltage, the pumping circuit comprising:
   a voltage detector configured to receive the internal voltage and a reference voltage and generate a voltage pumping enable signal;
   an oscillator for generating a clock signal in response to the voltage pumping enable signal;
   a pump controller for outputting a plurality of pump driving control signals in response to the clock signal; and
   a voltage pump for pumping the internal voltage in response to the pump driving control signals.

4. The voltage pumping device according to claim 3, wherein the first voltage level is a supply voltage level and the internal voltage is a high voltage level.

5. The voltage pumping device according to claim 3, wherein the first voltage level is a supply voltage level and the internal voltage is a back bias voltage level.

6. The voltage pumping device according to claim 3, wherein the pump controller is driven with the source voltage.

7. The voltage pumping device according to claim 3, wherein the voltage pump is driven with the source voltage.

8. The voltage pumping device according to claim 3, wherein the pump controller and the voltage pump are driven with the source voltage.

* * * * *